(12) United States Patent
Ren et al.

(10) Patent No.: US 11,121,916 B2
(45) Date of Patent: Sep. 14, 2021

(54) UPLINK TRANSMISSION METHOD AND APPARATUS

(71) Applicant: HUAWEI TECHNOLOGIES CO., LTD., Guangdong (CN)

(72) Inventors: Yi Ren, Shenzhen (CN); Jianqin Liu, Beijing (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/585,890

(22) Filed: Sep. 27, 2019

(65) Prior Publication Data

US 2020/0028742 A1 Jan. 23, 2020

Related U.S. Application Data

(63) Continuation of application No. PCT/CN2018/080335, filed on Mar. 23, 2018.

(30) Foreign Application Priority Data

Mar. 28, 2017 (CN) .......................... 201710193485.4

(51) Int. Cl.
*H04L 12/24* (2006.01)
*H04L 27/26* (2006.01)
(Continued)

(52) U.S. Cl.
CPC ...... *H04L 41/0806* (2013.01); *H04L 27/2605* (2013.01); *H04W 24/10* (2013.01); *H04W 72/044* (2013.01); *H04W 72/085* (2013.01)

(58) Field of Classification Search
CPC .......... H04L 41/0806; H04L 27/2605; H04W 24/10; H04W 72/044; H04W 72/085
(Continued)

(56) References Cited

U.S. PATENT DOCUMENTS

2016/0302096 A1* 10/2016 Chari ................... H04W 24/08
2016/0353510 A1 12/2016 Zhang et al.
(Continued)

FOREIGN PATENT DOCUMENTS

| CN | 102761901 A | 10/2012 |
|----|-------------|---------|
| CN | 103200610 A | 7/2013 |

(Continued)

OTHER PUBLICATIONS

3GPP TS 36.331,14.2.2 (Apr. 2017), "3rd Generation Partnership Project;Technical Specification Group Radio Access Network; Evolved Universal Terrestrial Radio Access (E-UTRA); Radio Resource Control (RRC); Protocol specification (Release 14)," Apr. 2017, 446 pages.

(Continued)

*Primary Examiner* — Peter G Solinsky
(74) *Attorney, Agent, or Firm* — Fish & Richardson P.C.

(57) ABSTRACT

The present disclosure relates to uplink transmission methods and apparatus. One example method includes sending, by a first device, a quality criterion event of at least one link between the first device and a second device to the second device, where a quality criterion event of each link includes at least one parameter, and receiving report information determined by the second device based on a quality criterion of the at least one link and the parameter in the quality criterion event of each link.

20 Claims, 7 Drawing Sheets

(51) Int. Cl.
*H04W 24/10* (2009.01)
*H04W 72/04* (2009.01)
*H04W 72/08* (2009.01)

(58) Field of Classification Search
USPC .......................................................... 370/254
See application file for complete search history.

(56) References Cited

U.S. PATENT DOCUMENTS

| 2018/0219606 | A1* | 8/2018 | Ng ........................ H04L 5/0053 |
| 2019/0074879 | A1* | 3/2019 | Furuskog ............... H04B 7/063 |
| 2020/0028609 | A1* | 1/2020 | Ahn ....................... H04W 24/08 |

FOREIGN PATENT DOCUMENTS

| JP | 2016507177 | A  | 3/2016 |
| WO | 2016018121 | A1 | 2/2016 |
| WO | 2016175690 | A1 | 11/2016 |
| WO | 2017028676 | A1 | 2/2017 |

OTHER PUBLICATIONS

Extended European Search Report issued in European Application No. 18778103.4 dated Jan. 22, 2020, 14 pages.
Huawei et al., "Discussion on link recovery procedure for beam blockage," 3GPP TSG RAN WG1 NR Ad Hoc Meeting, R1-1700041; Spokane, USA, Jan. 16-20, 2017, 5 pages.
Huawei et al., "Measurement and Mobility Considering Beamforming," 3GPP TSG-RAN2 Meeting #97, R2-1701130; Athens, Greece; XP051211842, Feb. 13-17, 2017, 6 pages.
LG Electronics et al., "WF on event-driven UL transmission in NR," 3GPP TSG RAN1 #87, R1-1613725; Reno, USA, Nov. 14-18, 2016, 2 pages.
LG Electronics, et al., "WF on UE initiated UL transmission in NR," 3GPP TSG RAN1 #87, R1-1613774; Reno, USA, Nov. 14-18, 2016, 2 pages.
Office Action issued in Chinese Application No. 201710193485.4 dated Mar. 12, 2019, 11 pages (with English translation).
Office Action issued in Chinese Application No. 201710193485.4 dated Aug. 27, 2019, 9 pages (with English translation).
Office Action issued in Indian Application No. 201947040563 dated Jun. 21, 2021, 8 pages.

\* cited by examiner

UPLINK TRANSMISSION METHOD AND APPARATUS

CROSS-REFERENCE TO RELATED APPLICATIONS

This application is a continuation of International Application No PCT/CN2018/080335, filed on Mar. 23, 2018, which claims priority to Chinese Patent Application No. 201710193485.4, filed on Mar. 28, 2017. The disclosures of the aforementioned applications are hereby incorporated by reference in their entireties.

TECHNICAL FIELD

This application relates to the field of communications technologies, and in particular, to an uplink transmission method and apparatus.

BACKGROUND

In a 5G communications system, high frequency communication at a frequency greater than 6 GHz is increasingly concerned by the academia and industry. However, due to rapid energy attenuation and a low penetration capability of high frequency signals in space, a path loss of signals in high frequency bands is far greater than that in a low frequency scenario. Therefore, gains on an antenna side need to be used to compensate for such a loss to ensure coverage of a high frequency system. In addition, a massive multiple input multiple output (Massive MIMO) technology is more applicable to a high frequency scenario because in the high frequency scenario, signals have shorter wavelengths and antennas have smaller volumes. With the use of the Massive MIMO technology, a transmit beam with more concentrated energy may be formed in a digital and analog manner on a base station side to ensure system coverage, and a receive beam with more concentrated energy may be similarly formed on a user side to increase a receive gain. Therefore, a design centered on a beam needs to be considered for the high frequency communication in the 5G communications system. Further, both a transmitting party and a receiving party in the high frequency system tend to use a narrow beam for communication, and it becomes pivotal to match narrow beams. A receive beam and a transmit beam in narrow beam communication are referred to as a beam pair link (BPL) herein. In addition, due to characteristics of a high frequency channel, signals undergo restricted diffraction but sufficient reflection. Due to low diffraction and high reflection, the high frequency channel presents significant features of spatial sparsity and local correlation.

The use of narrow beam communication and the presence of features of spatial sparsity and local correlation of a channel, matching of receive beams and transmit beams becomes pivotal in the high frequency communication. In brief, both a transmitting party and a receiving party need to perform beam sweeping before high-rate data communication, to determine an optimal BPL to perform communication. However, because behaviors of a user are unpredictable, user equipment may probably move or rotate during communication. Alternatively, during communication, an obstruction such as a vehicle or a pedestrian may exist in a path of the optimal BPL. Quality of the original optimal receive-transmit beams decreases in such cases, or even the user is directly disconnected as a result. Therefore, based on a design of a conventional long term evolution (LTE) system, a robust transmission problem requires special attention in a design of a communications system based on high frequency. To be specific, a corresponding mechanism needs to be designed to support fast connection recovery of the user upon frequent movements, rotations, and obstructions, thereby ensuring quality of a communications link.

Research shows that a user may monitor quality of the link of a current serving beam pair during beam switching in robust transmission, and start a corresponding emergency reporting process when the quality of the link changes rapidly. After receiving information reported by the user, a base station recovers the connection of the current user by using operations such as beam switching, transmit diversity, and a process of restarting beam training.

For the robust transmission problem in the high frequency scenario, fine beam tracking and coarse beam tracking are periodically performed between a base station and a user to ensure quality of a communications link in the prior art 1. When a BPL encounters a mismatch caused by a movement, a rotation, an obstruction, and the like, a user needs to wait till a next time of fine tracking or coarse tracking to perform beam sweeping again to recover a connection. Because movements, rotations, and obstructions occur at randomly distributed moments, the prior art 1 cannot ensure that the link is recovered in time. Although the foregoing problem may be somewhat avoided by shortening a period of beam sweeping, frequent beam sweeping causes a decrease in communication efficiency, and consequently overall system throughputs are reduced.

For the robust transmission problem in the high frequency scenario, a threshold-based triggering scheme is used to ensure quality of a communications link in the prior art 2. To be specific, a user keeps monitoring communication quality of a BPL of the user and starts a reporting process as soon as quality of a receive beam drops below a threshold. However, when a single threshold is used to trigger reporting, the user cannot determine whether a decrease in quality of a current link is caused by fast attenuation of a channel or is caused by a movement, a rotation or an obstruction. As a result, reporting may be frequently triggered, unwanted signaling overheads may be increased, and communication efficiency of an entire system is reduced.

SUMMARY

Embodiments of this application provide an uplink transmission method and apparatus, to resolve a problem of low communication efficiency of a system in a process of resolving a robust transmission problem of wireless communication in the prior art.

Specific technical solutions provided in the embodiments of this application are as follows.

According to a first aspect, an embodiment of this application provides an uplink transmission method, including:

sending, by a first device, a quality criterion event of at least one link between the first device and a second device to the second device, where a quality criterion event of each link includes at least one parameter; and receiving, by the first device, report information determined by the second device based on a quality criterion of the at least one link and the parameter in the quality criterion event of each link.

The first device configures a plurality of quality criterion events for the second device, so that the second device may accurately determine a quality condition of a current link based on a configuration of the first device, and perform triggering and reporting for a corresponding quality criterion event according to a configured rule. Different quality criterion event sets, different thresholds, and different time parameters may be flexibly configured by using signaling to serve different types of second devices, and the first device makes appropriate plans to appropriately distribute resources of an entire network, to ensure communication quality and communication efficiency between the first device and the second device, thereby further improving performance of the entire network.

With reference to the first aspect, in a possible design, the method further includes:

sending, by the first device, a reporting rule and a feedback format of the report information to the second device; and receiving, by the first device, the report information reported by the second device according to the reporting rule and the feedback format.

With reference to the first aspect, in a possible design, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

In the foregoing design, the first device flexibly configures different quality criterion events for the second device, the second device provides a feedback based on a determined event, and the first device triggers a specific behavior based on the feedback from the second device. An event-based feedback mode may effectively avoid a misconfiguration that occurs because the first device is unclear about an actual condition on a side of the second device.

With reference to the first aspect, in a possible design, the quality criterion event of the link is a specified relationship of the quality of the link between a current moment and a specified moment, and the specified moment is a moment before the current moment or a moment after the current moment.

In the foregoing design, the first device flexibly configures different quality criterion events for the second device, the second device provides a feedback based on a determined event, and the first device triggers a specific behavior based on the feedback from the second device. An event-based feedback mode may effectively avoid a misconfiguration that occurs because the first device is unclear about an actual condition on a side of the second device.

With reference to the first aspect, in a possible design, the parameter includes an offset type parameter and a threshold type parameter.

With reference to the first aspect, in a possible design, the report information includes any combination of: a type of an event triggered by the second device based on the quality criterion event of the link, a recommended operation that the first device is advised to use, and a recommended resource.

A feedback format and report content of the second device for a quality criterion event are regulated, so that when a quality criterion event is triggered, the second device may feed back information (for example, a quality criterion event ID) about the quality criterion event, and at the same time may feed back, from the perspective of the second device, an appropriate operation to use if current channel quality or a current channel changes. The first device (for example, a base station) may use information fed back by a user to better serve different users. In addition, if there are a large number of second devices and there are a large number of triggered quality criterion events, the first device may indirectly determine, based on report information such as a recommended operation of a user, a degree of urgency of recovering the link of the user, to distribute resources in a more balanced fashion from the perspective of an entire network to perform sequential connection recovery work. In addition, a recommended resource or a recommended beam fed back by a side of the second device may assist the first device in performing an operation such as beam switching and space diversity more rapidly and more effectively, thereby improving working efficiency of an entire system.

With reference to the first aspect, in a possible design, after the receiving, by the first device, report information determined by the second device based on a quality criterion of the at least one link and the parameter in the quality criterion event of each link, the method further includes:

selecting, by the first device, a transmit mode and/or a transmit resource and/or a transmit port and/or beamforming and/or a transmit reference signal and/or a measurement process based on the report information.

With reference to the first aspect, in a possible design, the method further includes:

configuring, by the first device, a communication parameter set for each quality criterion event, and sending the communication parameter set to the second device, where after any quality criterion event is triggered, the first device and the second device communicate by using communication parameters in a corresponding communication parameter set configured for the any quality criterion event, and the communication parameter set is any combination of: a subcarrier spacing, a timeslot length, and a cyclic prefix type.

In this design, the first device may use higher layer signaling to configure, for the first device and the second device, different communication parameter sets used after different quality criterion events are triggered. After a specific quality criterion event is triggered, the first device and the second device communicate by using a corresponding communication parameter set, so that link recovery work can be accelerated, and a link is recovered after a shorter wait time.

According to a second aspect, an embodiment of this application provides an uplink transmission method, including:

receiving, by a second device, a quality criterion event of at least one link sent by a first device, where a quality criterion event of each link includes at least one parameter;

determining, by the second device, report information based on a quality criterion of the at least one link and the parameter in the quality criterion event of each link; and sending, by the second device, the report information to the first device.

The second device can accurately determine, based on a plurality of quality criterion events configured by the first device, a quality condition of a current link, and perform triggering of a corresponding quality criterion event and reporting according to a configured rule. Therefore, the first device makes appropriate plans to appropriately distribute resources of an entire network, to ensure communication quality and communication efficiency between the first device and the second device, thereby further improving performance of the entire network.

With reference to the second aspect, in a possible design, the method further includes:

receiving, by the second device, a reporting rule and a feedback format of the report information that are sent by the first device; and reporting, by the second device, the report information to the first device according to the reporting rule and the feedback format.

With reference to the second aspect, in a possible design, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

In the foregoing design, the first device flexibly configures different quality criterion events for the second device, the second device provides a feedback based on a determined event, and the first device triggers a specific behavior based on the feedback from the second device. An event-based feedback mode may effectively avoid a misconfiguration that occurs because the first device is unclear about an actual condition on a side of the second device.

With reference to the second aspect, in a possible design, the quality criterion event of the link is a specified relationship of the quality of the link between a current moment and a specified moment, and the specified moment is a moment before the current moment or a moment after the current moment.

In the foregoing design, the first device flexibly configures different quality criterion events for the second device, the second device provides a feedback based on a determined event, and the first device triggers a specific behavior based on the feedback from the second device. An event-based feedback mode may effectively avoid a misconfiguration that occurs because the first device is unclear about an actual condition on a side of the second device.

With reference to the second aspect, in a possible design, the parameter includes an offset type parameter and a threshold type parameter.

With reference to the second aspect, in a possible design, the report information includes any combination of: a type of an event triggered by the second device based on the quality criterion event of the link, a recommended operation that the first device is advised to use, and a recommended resource.

A feedback format and report content of the second device for a quality criterion event are regulated, so that when a quality criterion event is triggered, the second device may feed back information (for example, a quality criterion event ID) about the quality criterion event, and at the same time may feed back, from the perspective of the second device, an appropriate operation to use if current channel quality or a current channel changes. The first device (for example, a base station) may use information fed back by a user to better serve different users. In addition, if there are a large number of second devices and there are a large number of triggered quality criterion report events, the first device may indirectly determine, based on report information such as a recommended operation of a user, a degree of urgency of recovering the link of the user, to distribute resources in a more balanced fashion from the perspective of an entire network to perform sequential connection recovery work. In addition, a recommended resource or a recommended beam fed back by a side of the second device may assist the first device in performing an operation such as beam switching and space diversity more rapidly and more effectively, thereby improving working efficiency of an entire system.

With reference to the second aspect, in a possible design, the method further includes:

receiving, by the second device, a communication parameter set configured by the first device for each quality criterion event, where after any quality criterion event is triggered, the second device and the first device communicate by using communication parameters in a corresponding communication parameter set configured for the any quality criterion event, and the communication parameter set is any combination of: a subcarrier spacing, a timeslot length, and a cyclic prefix type.

In this design, the first device configures, for the second device, different communication parameter sets used after different quality criterion events are triggered. Therefore, after a specific quality criterion event is triggered, the second device and the first device communicate by using a corresponding communication parameter set, so that link recovery work can be accelerated, and a link is recovered after a shorter wait time.

According to a third aspect, an embodiment of this application provides an uplink transmission apparatus, applied to a first device, and including:

a processing unit, configured to configure a quality criterion event of at least one link between the first device and a second device;

a sending unit, configured to send the quality criterion event of the at least one link between the first device and the second device to the second device, where a quality criterion event of each link includes at least one parameter; and a receiving unit, configured to receive report information determined by the second device based on a quality criterion of the at least one link and the parameter in the quality criterion event of each link.

With reference to the third aspect, in a possible design, the sending unit is further configured to:

send a reporting rule and a feedback format of the report information to the second device; and the receiving unit is further configured to receive the report information reported by the second device according to the reporting rule and the feedback format.

With reference to the third aspect, in a possible design, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

With reference to the third aspect, in a possible design, the quality criterion event of the link is a specified relationship of the quality of the link between a current moment and a specified moment, and the specified moment is a moment before the current moment or a moment after the current moment.

With reference to the third aspect, in a possible design, the parameter includes an offset type parameter and a threshold type parameter.

With reference to the third aspect, in a possible design, the report information includes any combination of: a type of an event triggered by the second device based on the quality criterion event of the link, a recommended operation that the first device is advised to use, and a recommended resource.

With reference to the third aspect, in a possible design, the processing unit is further configured to:

select a transmit mode and/or a transmit resource and/or a transmit port and/or beamforming and/or a transmit reference signal and/or a measurement process based on the report information.

With reference to the third aspect, in a possible design, the processing unit is further configured to:

configure a communication parameter set for each quality criterion event, and send the communication parameter set to the second device by using the sending unit, where after any quality criterion event is triggered, the first device and the second device communicate by using communication parameters in a corresponding communication parameter set configured for the any quality criterion event, and the communication parameter set is any combination of: a subcarrier spacing, a timeslot length, and a cyclic prefix type.

For the principles for resolving the problem and beneficial effects of the uplink transmission apparatus, refer to the implementations of and the beneficial effects brought by the foregoing uplink transmission method in the first aspect and each possible design of the first aspect. Therefore, for the implementations of the uplink transmission apparatus, refer to the implementations of the foregoing uplink transmission method in the first aspect and each possible design of the first aspect. Details of repeated parts are not described.

According to a fourth aspect, an embodiment of this application provides an uplink transmission apparatus, applied to a second device, and including:

a receiving unit, configured to receive a quality criterion event of at least one link sent by a first device, where a quality criterion event of each link includes at least one parameter;

a processing unit, configured to determine report information based on a quality criterion of the at least one link and the parameter in the quality criterion event of each link; and a sending unit, configured to send the report information to the first device.

With reference to the fourth aspect, in a possible design, the receiving unit is further configured to:

receive a reporting rule and a feedback format of the report information that are sent by the first device; and report the report information to the first device according to the reporting rule and the feedback format.

With reference to the fourth aspect, in a possible design, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

With reference to the fourth aspect, in a possible design, the quality criterion event of the link is a specified relationship of the quality of the link between a current moment and a specified moment, and the specified moment is a moment before the current moment or a moment after the current moment.

With reference to the fourth aspect, in a possible design, the parameter includes an offset type parameter and a threshold type parameter.

With reference to the fourth aspect, in a possible design, the report information includes any combination of: a type of an event triggered by the second device based on the quality criterion event of the link, a recommended operation that the first device is advised to use, and a recommended resource.

With reference to the fourth aspect, in a possible design, the processing unit is further configured to:

receive, by using the receiving unit, a communication parameter set configured by the first device for each quality criterion event, where after any quality criterion event is triggered, the second device and the first device communicate by using communication parameters in a corresponding communication parameter set configured for the any quality criterion event, and the communication parameter set is any combination of: a subcarrier spacing, a timeslot length, and a cyclic prefix type.

For the principles for resolving the problem and beneficial effects of the uplink transmission apparatus, refer to the implementations of and the beneficial effects brought by the foregoing uplink transmission method in the second aspect and each possible design of the second aspect. Therefore, for the implementations of the uplink transmission apparatus, refer to the implements of the foregoing uplink transmission method in the second aspect and each possible design of the second aspect. Details of repeated parts are not described.

According to a fifth aspect, an embodiment of this application provides a first device, the first device including a processor, a memory, a receiver, and a transmitter, where the memory stores a computer readable program, and the processor executes the program in the memory to control the receiver and the transmitter to implement the uplink transmission method in the first aspect.

For the principles for resolving the problem and beneficial effects of the first device, refer to the implementations of and the beneficial effects brought by the foregoing uplink transmission method in the first aspect and each possible design of the first aspect. Therefore, for the implementations of the first device, refer to the foregoing implementations of the uplink transmission method in the first aspect and each possible design of the first aspect. Details of repeated parts are not described.

According to a sixth aspect, an embodiment of this application provides a second device, the second device including a processor, a memory, a receiver, and a transmitter, where the memory stores a computer readable program, and the processor executes the program in the memory to control the receiver and the transmitter to implement the uplink transmission method in the second aspect.

For the principles for resolving the problem and beneficial effects of the second device, refer to the implementations of and the beneficial effects brought by the foregoing uplink transmission method in the second aspect and each possible design of the second aspect. Therefore, for the implementations of the second device, refer to implementations of the foregoing uplink transmission method in the second aspect and each possible design of the second aspect. Details of repeated parts are not described.

According to a seventh aspect, an embodiment of this application provides a computer storage medium, where the storage medium is a computer readable storage medium, the computer readable storage medium stores a program, the program includes instructions, and the instructions enables, when being executed by an electronic device having a processor, the electronic device to perform the foregoing uplink transmission method in the first aspect and each possible implementation of the first aspect.

According to an eighth aspect, an embodiment of this application provides a computer storage medium, where the storage medium is a computer readable storage medium, the computer readable storage medium stores a program, the program includes instructions, and the instructions enable, when being executed by a network device having a processor, the network device to perform the foregoing uplink transmission method in the second aspect and each possible implementation of the second aspect.

It may be learned that in the foregoing aspects, a first device sends a quality criterion event of at least one link between the first device and a second device to the second device, where the quality criterion event of each link includes at least one parameter, so that the second device determines report information of quality of the link according to a quality criterion of the at least one link and the parameter in the quality criterion event of each link and feeds back the report information to the first device. Compared with an uplink transmission solution in the prior art, in this application, the second device can quickly feed back quality of a communications link between the second device and the first device based on a quality criterion event configured by the first device, so that it is convenient for the first device to trigger a specific behavior to ensure quality of the link, thereby improving communication efficiency.

DESCRIPTION OF EMBODIMENTS

Figure 1:
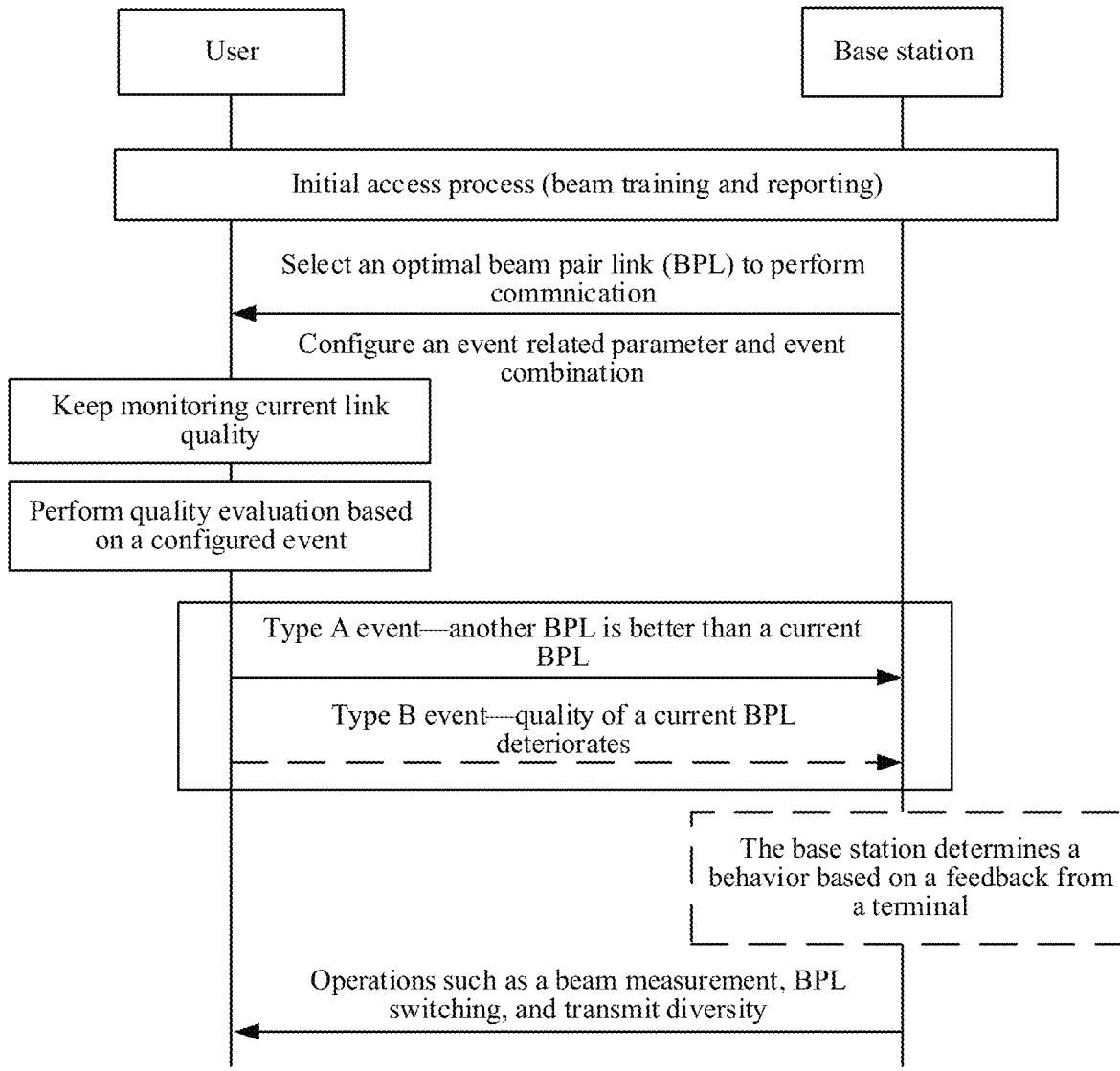
FIG. 1 is a flowchart of an event-based uplink transmission method according to an embodiment of this application.

The following clearly describes the technical solutions in the embodiments of this application with reference to the accompanying drawings in the embodiments of this application.

"A plurality of" in this application is "two or more".

In addition, it should be understood that in the description of this application, the words such as "first" and "second" are only used for differentiating description, but should not be understood as indicating or implying the relative importance or should not be understood as indicating or implying a sequence.

An uplink transmission method in embodiments of this application is mainly about a process in which a terminal and a network device in a radio access network perform data transmission. The terminal may also be referred to as a user terminal, and include a handheld device with a wireless communication function, an in-vehicle device, a wearable device, a computing device, another processing device connected to a wireless modem, and various forms of user equipment (UE), mobile stations (MS), terminal equipment (TE), relay devices, and the like. The network device may include various apparatuses providing a terminal with a communication function in a radio access network, for example, may be a base station, and the base station may include various forms of macro base stations, micro base stations, relay stations, access points, and the like. The base station may have different names in systems using different radio access technologies, and is, for example, referred to as an evolved Node B (eNB or eNodeB) in a long term evolution (LTE) network, and referred to as a Node B in a third-generation 3G network.

A technology described in the embodiments of this application may be applicable to an LTE system or other wireless communications systems using various radio access technologies, for example, systems using access technologies such as code division multiple access, frequency division multiple access, time division multiple access, orthogonal frequency division multiple access, and single carrier frequency division multiple access. In addition, the technology may further be applicable to a subsequent system evolving from the LTE system, for example, a fifth generation 5G system.

It should be noted that a first device in the embodiments of this application may be a network device such as a base station or a relay device, and a second device may be a user terminal.

Embodiments of this application provide an uplink transmission method and apparatus, to resolve a problem of low communication efficiency of a system in a process of resolving a robust transmission problem of wireless communication in the prior art, in particular, a high frequency communication scenario in wireless communication. The method and the apparatus are conceived based on a same inventive concept. The method and the apparatus have similar principles for resolving the problem. Therefore, for implementation of the apparatus and the method, refer to each other. Details of repeated parts are not described.

This application is applied to a beam-based wireless communication scenario. Neither a carrier frequency of communication nor a topology of a communication network is restricted. However, because the problem of this application originates from a beam mismatch problem caused by beam narrowing and an obstruction problem caused by high reflection and low diffraction in a high frequency channel in a wireless communication scenario, this application is further applicable to a high frequency scenario.

FIG. 1 is a flowchart of an event-based uplink transmission method according to an embodiment of this application. This application mainly provides definitions of a type-A quality criterion event and a type-B quality criterion event. For ease of description, the quality criterion event may also be referred to as an event for short in this application. A series of determining criteria are regulated in the two types of events, so that a second device can initially determine a channel quality change on a side of the second device based on quality and a quality change degree of a link between the second device and a first device, and provides feedbacks for the event based on a regulated report format and reporting rule. Based on these feedbacks, the first device may better understand a status of quality of a current link and accordingly use a most appropriate strategy to recover the quality of the link.

The type-A quality criterion event is used to describe a difference between the quality of the current link and quality of another link, for example, describe a relationship between a current BPL and another BPL (for example, a BPL being monitored by the second device). This relationship is similar to a relationship between a current serving cell and an adjacent cell. The type-B quality criterion event is used to describe a difference of quality of the link between different moments, for example, describe a relationship of a current BPL between different moments, and mainly reflects a change of a serving BPL in an event dimension. Such an event may reflect a sudden event such as a rotation, a movement, an obstruction in a channel path of a user. After these sudden events occur, the second device starts a reporting process to notify the sudden events to the first device and advise the first device to use a specific measure. It should be noted that the another BPL in the present invention may be from a different first device or another second device or may be from a different antenna array of the same first device or may be from the same antenna array of the same first device.

Figure 2:
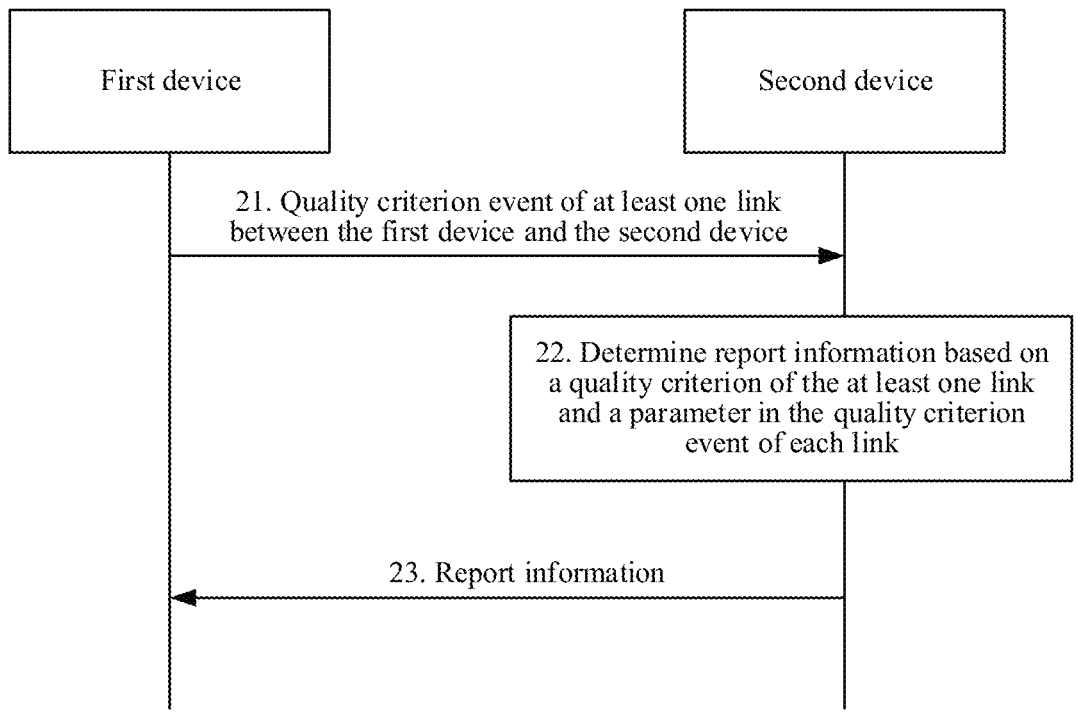
FIG. 2 is a schematic flowchart of an uplink transmission method according to an embodiment of this application.

FIG. 2 is a schematic diagram of a procedure of an uplink transmission method according to an embodiment of this application. The procedure may be implemented by using hardware, software programming or a combination of software and hardware.

As shown in FIG. 2, the procedure includes the following processing processes:

Step 21: A first device sends a quality criterion event of at least one link between the first device and a second device to the second device, where a quality criterion event of each link includes at least one parameter.

A connection between the first device and the second device is a high frequency connection or a low frequency connection, and the parameter includes an offset type parameter and a threshold type parameter.

The link in this application may be a BPL or port pair, and the quality of the link may be a reference signal received power (RSRP), a channel quality indicator (CQI) or the like.

Step 22: The second device determines report information based on a quality criterion of the at least one link and the parameter in the quality criterion event of each link.

Step 23: The second device sends the determined report information to the first device.

It should be noted that before the first device performs step 21, the first device configures a quality criterion event of a link for the second device. When a plurality of links exist between the first device and the second device, the first device configures different groups of quality criterion events of the links for the second device. When a plurality of links exist between the first device and the second device, the links may be a plurality of routing paths or may be from different antenna arrays of the first device or may be from different first devices or different second devices. The first device configures a quality criterion event respectively for different links. For example, when N (N>1 and is a positive integer) links that are being used or monitored exist between the first device and the second device, the first device configures a quality criterion event respectively for the N links. The first device at the same time configures a parameter M (M<=N) for the second device. The second device reports a link recovery request when events of M or more links of the N links are triggered. When a plurality of devices exist in a link between the first device and the second device (for example, a multihop route scenario), the quality criterion event configured by the first device for the second device applies to all related devices in the link. That is, when a device in the link determines that an event is triggered, the device needs to make a report to the first device based on a format of the second device.

In the embodiments of this application, a type-A quality criterion event is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

All type-A events in this application are listed below. Optionally, in a possible implementation, the type-A event mainly describes a quality relationship between a current BPL and another BPL and a relationship between the current BPL and a specific threshold. Four type-A events are listed below, and are A1, A2, A3, and A4.

A1: Comparison between quality of a serving BPL and a specific threshold.

A1-1 (Selection condition): $M\_s-Hys>Thresh$

A1-2 (Leave condition): $M\_s+Hys<Thresh$ $M\_s$ is link quality of the current BPL and is measured by a user, Hys is a magnetic hysteresis parameter configured by a base station, and Thresh is a threshold type parameter configured by the base station.

If A1-1 is satisfied, it is considered that the current BPL has good quality, and the current BPL continues to be used. If A1-2 is satisfied, the current BPL has poor quality, and the base station may select to perform fine beam tracking to select an optimal BPL again.

A2: Comparison between quality of a serving BPL and quality of another BPL.

A2-1 (Selection condition): $M_n+Ofn+Obn-Hys>M\_s+Ofs+Obs$ A2-2 (Leave condition): $M_n+Ofn+Obn+Hys<M\_s+Ofs+Obs$ $M\_n$ is link quality of the another BPL and is measured by a user, and Ofn, Obn, Ofs, and Obs are offset type parameters configured by the base station and respectively represent a frequency-specific offset and a beam-specific offset in the another BPL and a frequency-specific offset and a beam-specific offset in the serving BPL.

If A2-1 is satisfied, it is considered that the current BPL is an optimal BPL in a monitored range, and the current BPL continues to be used. If A2-2 is satisfied, a better BPL exists in the monitored range, and the base station may select to perform beam switching to select a new BPL.

A3: Comparison between quality of another BPL and a specific threshold.

A3-1 (Selection condition): $M\_n-Hys>Thresh$

A3-2 (Leave condition): $M\_n+Hys<Thresh$

If A3-1 is satisfied, link quality of the another BPL is good, and the base station may record the good BPL, and the beam is used when beam switching or a transmit diversity mode is triggered. If A3-2 is satisfied, the link quality of the monitored another BPL is relatively poor, and the base station may require, when configuring a measurement feedback, that the user monitors another BPL.

A4: A relationship among quality of another BPL, quality of a current BPL, and a specific threshold.

A4-1 (Selection condition 1): $M\_n+Hys<Thresh1$

A4-2 (Selection condition 2): $M\_s+Ofn+Obn-Hys>Thresh2$

A4-3 (Leave condition 1): $M\_n-Hys>Thresh1$

A4-4 (Leave condition 2): $M\_s+Ofn+Obn+Hys<Thresh2$

When a user satisfies A4-1 and A4-2, that is, link quality of the current BPL is moderately good and link quality of the another BPL is moderately poor, the base station may select to advise no BPL switching. When the user satisfies A4-3 or A4-4, that is, the link quality of the current BPL is moderately poor or the link quality of the another BPL is moderately good, the base station may advise BPL switching. The A4 event may be considered as a combination of the foregoing other events.

It may be learned that the base station flexibly configures different quality criterion events for a user. In addition, the base station configures parameters such as a magnetic hysteresis coefficient and a deviation coefficient. Therefore, when the user performs determining on a current BPL and a monitored BPL, a determining result may be prevented from frequently changing because of fast attenuation, so that a ping-pong handover is less likely to occur. In addition, the user provides a feedback based on a determined event, and the base station triggers a specific behavior based on the feedback of the user, for example, triggers a process such as beam switching, transmit diversity, and beam training. Compared with direct configuration of these processes by the base station, in the mode based on an event feedback from a user, a misconfiguration that occurs because the base station is unclear about an actual condition on a side of the user can be effectively avoided.

In the embodiments of this application, a type-B quality criterion event is a specified relationship of the quality of the link between a current moment and a specified moment, and the specified moment is a moment before the current moment or a moment after the current moment.

All type-B events in this application are listed below. Optionally, in a possible implementation, the type-B event mainly describes a relationship between the current BPL and a past measurement record of the BPL, a relationship between quality of the current BPL and quality of the BPL measured again after a wait time, and a relationship between the current BPL and a specific threshold. Three type-B events are listed below, and are B1, B2, and B3.

Figure 3:
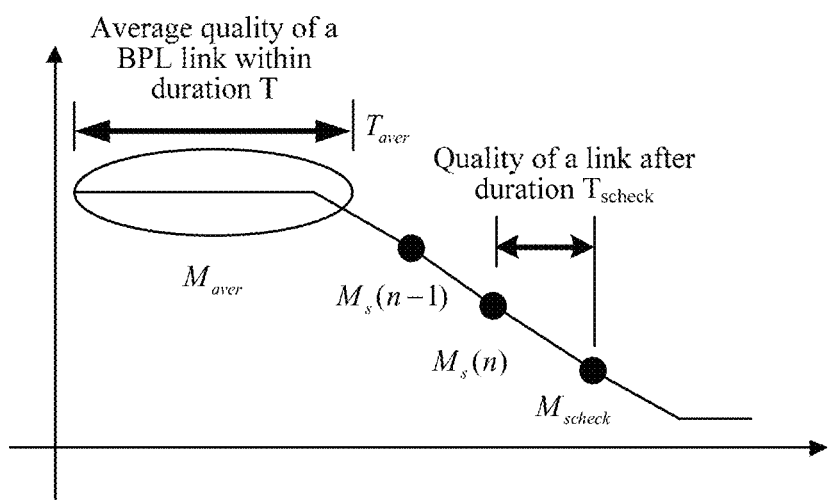
FIG. 3 is a schematic diagram of a relationship between quality of a BPL and a user measurement time point according to an embodiment of this application.

FIG. 3 is a schematic diagram of a relationship between the quality of the current BPL and a user measurement time point.

B1: The quality of serving BPL gradually improves compared with the BPL in the past.

B1-1 (Selection condition): $M_s(n)-M_s(n-1)>$Thresh·T
B1-2 (Selection condition): $M_s(n)-M_{aver}>$Thresh·T
B1-3 (Selection condition): $M_s(n)-$Hys$>$Thresh·T $M_s(n)$ is the link quality of the current BPL, $M_s(n-1)$ is link quality of the BPL measured by the user a previous time, and both $M_s(n)$ and $M_s(n-1)$ are measured by the user; $M_{aver}$ is average quality of the BPL link measured by the user in a time window configured by the base station; Hys is a magnetic hysteresis parameter configured by the base station; Thresh is a threshold parameter configured by the base station; and T is a time between two times of measurement and is configured by the base station. When any condition of B1-1, B1-2, and B1-3 is satisfied, the current BPL is usable, the current BPL still has room for optimization, and the user may advise the base station to start a fine beam tracking process.

B2: Quality of the serving BPL deteriorates compared with the BPL in the past.

B2-1 (Reporting condition): Thresh1·T$<M_s(n-1)-M_s(n)<$Thresh2·T
B2-2 (Reporting condition): Thresh1·T$<M_{aver}-M_s(n)<$Thresh2·T
B2-3 (Reporting condition): $M_s(n-1)-M_s(n)<$Thresh·T
B2-4 (Reporting condition): $M_{aver}-M_s(n)<$Thresh3·T
B2-5 (Reporting condition): $M_s(n)+$Hys$<$Thresh
B2-6 (Reporting condition): $M_s(n)-$Hys$>$Thresh $M_s(n)$ is the link quality of the current BPL, $M_s(n-1)$ is link quality of the BPL measured by the user a previous time, and both $M_s(n)$ and $M_s(n-1)$ are measured by the user; $M_{aver}$ is average quality of the BPL link observed by the user in a time window configured by the base station; Hys is a magnetic hysteresis parameter configured by the base station; Thresh1, Thresh2, and Thresh3 are threshold parameters configured by the base station; and T is a time between two times of measurement and is configured by the base station. B2 events describe cases in which the quality of the serving BPL deteriorates. B2-1 describes a case in which a channel quality decrease rate obtained by comparing the quality of the current BPL with a previous measurement is within a range. B1-2 describes a case in which a channel quality decrease rate obtained by comparing the quality of the current BPL with an average of several previous measurements is within a range. B2-3 describes a case in which a channel quality decrease rate obtained by comparing the current BPL with a previous measurement (an average of several previous measurements) is higher than a threshold. B2-4 describes a case in which a channel quality decrease rate obtained by comparing the current BPL with an average of several previous measurements is higher than a threshold. An event window $T_{aver}$ related to $M_{aver}$ may be configured by the base station. B2-5 describes that current quality of service is already lower than a threshold. B2-series quality criterion events may together determine severity of a breakage status of the current BPL. For example, when an obstruction occurs, both B2-4 and B2-5 are triggered. It indicates that the current BPL may attenuate at a very fast speed and is eventually broken. In this case, the user may determine that the breakage scenario is an urgency event, to rapidly perform reporting and link recovery work. When B2-1 or B2-2 is triggered together with B2-6, the user may consider that the current BPL is slowly deteriorating, and the quality of the link is still adequate to maintain communication. In this case, the user may determine that the scenario is a nonurgent mismatch case, to advise the base station to use a fine tracking manner, a beam width-widening manner or the like to serve the user.

B3: Quality of the serving BPL is deteriorating as compared with the BPL in the future.

B3-1 (Selection condition, triggered by M B2): $M_{scheck}-$Hys$>$Thresh
B3-2 (Reporting condition, triggered by B2): $M_{scheck}+$Hys$<$Thresh $M_{scheck}$ is link quality of the current BPL measured again after a period of time $T_{check}$, as shown in FIG. 3. A B3 event is generally triggered by a B2 event. To be specific, when the user finds that quality of a current BPL starts to decrease, it may be determined that the user is rotating. In this case, it may be unnecessary to change a transmit beam in an optimal BPL. In this case, the user attempts to perform link recovery by using a method such as a beam width-widening beam method, a method for performing reception simultaneously in a plurality of directions, or a method for performing beamforming angle compensation by using a sensor of the user. A time that the base station allows the user to perform link recovery is $T_{check}$. After completing an operation of attempting recovery, the user needs to measure link quality again. If the link quality is still poor at this time, the user determines that link recovery cannot be performed by using an operation of the user, and then makes a report to the base station to request the base station to use a new beam recovery process, for example, beam training.

It may be learned from herein that a type-B quality criterion event uses a current measurement value of quality of a serving BPL as a reference. The user may compare quality of a BPL with quality of the same BPL at a previous moment or an average of quality of the same BPL within a past period of time. The type-B quality criterion event further uses a decrease speed of quality of a BPL to categorize an urgency degree of an event, so that the base station may coordinate different users according to different urgency degrees.

In addition, the type-B quality criterion event further defines comparison between a current measurement value of a serving BPL and a measurement value after a period of time. The interval time $T_{check}$ is configured by the base station. The benefit of this approach is that a user is allowed to first attempt to recover the link by using some implementation behaviors of the user. When the user cannot recover the link, the user then makes a report, and the base station performs operations such as beam training, switching, and diversity. Such operations may reduce a probability that the user makes a report, reduce a service amount of processing of the base station, but somewhat increase load of the user. However, from the perspective of a network side, such a mode has a relatively high gain when there is a larger quantity of users and overall channel conditions are relatively poor.

In addition, the base station may further use signaling to configure a combination of quality criterion events followed by a user terminal. Further, the base station needs to use signaling to configure some parameters in a quality criterion event corresponding to the user terminal. The feedback of the user may include a determining result of a quality criterion event and a behavior that the base station is advised to start, for example, one or more of beam switching, transmit diversity, receive beam training, fine beam tracking, and an ID of a spare beam.

All parameters that appear in the type-A quality criterion events and the type-B quality criterion events and that need to be configured by the base station in a downlink in the embodiments of this application are enumerated below. These parameters may be indicated by using radio resource control (RRC signaling), MAC control element (CE) signaling or downlink control information (DCI) signaling. Table 1 and Table 2 separately list a series of parameters that appear in this application and that need to be indicated by the base station to a user. The base station needs to first use higher layer signaling to configure that the user terminal enters a monitoring state. The base station configures an appropriate quality criterion event set and feedback format for a user according to a service grade (a VIP user, an active user, a cell center/edge user, or the like) of the user terminal.

a set of events that need to be determined by a user is configured by an Event field, a feedback format and a reporting rule are configured by a Reporting field, and designs of all possible combinations in a configured quality criterion event set need to be simplified.

TABLE 1

Indication parameters in type-A quality criterion events

| Parameter | Meaning | Application event | Preferential signaling |
|---|---|---|---|
| Event | Set of measured and determined events configured for a user | A1, A2, A3, A4 | RRC |
| Reporting | Type of a feedback of a user is regulated | A1, A2, A3, A4 | RRC |
| Hys | Magnetic hysteresis parameter, used to prevent frequent event switching caused by a single threshold | A1, A2, A3, A4 | RRC or MAC-CE |
| Ofn Obn Ogn | Frequency, beam, and group-specific offsets of an adjacent BPL | A2, A3, A4 | MAC-CE or DCI |
| Ofs Obs Ogs | Frequency, beam, and group-specific offsets of a serving BPL | A2 | MAC-CE or DCI |
| Thresh | Threshold in a single-threshold scenario | A1, A3 | RRC or MAC-CE |
| Thresh 1, Thresh 2 | Thresholds in a double-threshold scenario | A4 | RRC or MAC-CE |

TABLE 2

Indication parameters in type-B quality criterion events

| Parameter | Meaning | Application event | Preferential signaling |
|---|---|---|---|
| Event | Set of measured and determined events configured for a user | B1, B2, B3 | RRC |
| Reporting | Type of a feedback of a user is regulated | B1, B2, B3 | RRC |
| T | User measurement interval | B1, B2, B3 | RRC |
| Hys | Magnetic hysteresis parameter, used to prevent frequent event switching caused by a single threshold | B1, B2, B3 | RRC or MAC-CE |
| Thresh | Threshold in a single-threshold scenario | B1, B2, B3 | RRC or MAC-CE |
| Thresh 1 Thresh 2 Thresh 3 | Thresholds in a three-threshold scenario | B3 | RRC or MAC-CE |
| $T_{check}$ | Wait time between a measurement and a next measurement | B3 | MAC-CE or DCI |
| $T_{aver}$ | Average time window of quality of a BPL in the past | B1, B2 | RRC or MAC-CE |

It should be noted that a quantity of bits, a possible value, and an event mapping relationship of each specific parameter are not particularly limited in this application.

Optionally, when sending the quality criterion event of the at least one link between the first device and the second device to the second device, the first device sends a reporting rule and a feedback format of the report information to the second device; and the first device receives the report information reported by the second device according to the reporting rule and the feedback format.

in the embodiments of this application, an interface of a configuration of a quality criterion event and a series of reporting rules are provided between the first device (that is, the base station) and the second device (that is, a user terminal). These reporting rules may enable the user terminal to accurately determine a condition of the current BPL based on a configuration of the base station and perform triggering of a corresponding quality criterion event and reporting according to a configured rule. Different quality criterion event sets, different thresholds, and different time parameters may be flexibly configured by using signaling to serve different types of second devices. For example, different combinations of quality criterion events and different thresholds may be used for a cell center user and a cell edge user. The base station makes appropriate plans to appropriately distribute resources of an entire network, thereby ensuring performance of the entire network.

the magnetic hysteresis parameter Hys among the parameters is used to prevent switching from being frequently triggered between adjacent BPLs, thereby preventing a ping-pong effect. A multi-threshold parameter setting manner is more flexible than a manner using a magnetic hysteresis parameter, and a single threshold may be separately used to adapt to changing scenarios. An average time window $T_{aver}$ of quality of a BPL in the past is set in the type-B quality criterion events to compare quality of a current BPL with average quality of the BPL in the past, thereby avoiding a misjudgment caused by fast channel attenuation. A wait time length T check after a measurement is set, so that T check may be used as a wait time (for example, a plurality of users report some events in a contention manner) when a user performs switching, and when a beam mismatch occurs, some advanced receivers may first use a beam recovery mechanism on a user side, for example, switch a wide beam, and recalculate a receive beam by using angle compensation of a sensor. The benefit of this measure is that it is not necessary to notify the base station when a transmit beam does not need to be changed in an optimal BPL, thereby reducing load of an entire network. In addition, a connection may be recovered more rapidly if a user starts a beam recovery mechanism.

For the feedback format of the report information when different quality criterion events are triggered, the first device (that is, the base station) uses signaling to configure a series of events and related parameters for the second device (that is, a user terminal). The user terminal performs periodic channel quality monitoring based on a configured measurement parameter. The channel quality monitoring may be completed by using different reference signals such as a data demodulation reference signal (DMRS). The user terminal uses a current reference signal to determine the quality of the current BPL and records measurements of the BPL in the past. When a specific quality criterion event is triggered, a user sends a reporting request and starts a reporting process. The reporting process may be a procedure similar to an uplink reference (for example, sounding) signal or may be a mechanism similar to random access. A specific uplink manner is not limited in this application.

In addition, content of the report information reported by the user terminal is further regulated in this application, and a reporting format and rule are configured by the base station by using the Reporting field described in the foregoing Table 1 and Table 2.

For example, the user terminal may have several reporting formats as follows:

I. Quality Criterion Event ID.

The quality criterion event ID is used to indicate a reported and triggered quality criterion event in a configured quality criterion event set.

II. Quality Criterion Event ID+Recommended Operation.

The quality criterion event ID is the same as the above.

The recommended operation is an operation that is recommended to use. The operation includes link switching, transmit diversity or a measurement reporting process. The transmit diversity may be open-loop, semi-open-loop or closed-loop transmit diversity. The first device in the measurement reporting process may use a same transmit port to repeatedly transmit a multiple measurement reference signal a plurality of times. A quantity of repeated times may be determined based on a feedback of the second device. In the reporting process, the first device may use different ports to transmit a measurement reference signal repeatedly or once. A quantity of repeated times and a port group to which a used transmit port belongs may be determined based on a feedback of the second device.

A target link in the link switching may be determined by the first device based on a recommendation from the second device.

A diversity link used in the transmit diversity may be determined by the first device based on a recommendation from the second device.

III. Quality Criterion Event ID+Recommended Operation+Corresponding Parameter.

The quality criterion event ID and the recommended operation are the same as above.

A parameter in the recommended operation, for example, a quantity of times of repetition of a reference signal that the base station is required to send when training of a receive beam is started, is reported simultaneously.

IV. Quality Criterion Event ID+Recommended Operation+Recommended Resource.

The quality criterion event ID and the recommended operation are the same as above.

The recommended resource is that a transmit beam or a transmit resource that the first device (for example, the base station) is recommended to use is reported simultaneously based on a measurement of the second device. The recommended resource is used in the recommended operation such as space diversity and beam switching.

It should be noted that the report format of the report information is not limited to the foregoing types. In addition, the quality criterion event ID may implicitly indicate an urgency degree of a quality criterion event of a current user. For example, when quality criterion events B2-4 and B2-5 are both triggered, it indicates that quality of a current BPL is attenuating at a very fast speed below a threshold. In this case, the first device (for example, the base station) should process this event with urgency, thereby ensuring a connection of the user terminal.

In addition, a service priority grade, position information (for example, a cell edge/center) or the like of the user terminal may be regulated by the base station or may be reported by the user terminal.

A feedback format and report content of the second device such as a user terminal for a quality criterion event are regulated, so that when a quality criterion event is triggered, the user terminal may feed back information (for example, a quality criterion event ID) about the quality criterion event, and at the same time may feed back, from the perspective of the user terminal, an appropriate operation to use if current channel quality or a current channel changes. The first device (for example, the base station) may use information fed back by a user to better serve different users. In addition, if there are a large number of users and there are a large number of triggered quality criterion report events, the first device (for example, the base station) may indirectly determine, based on report information such as a recommended operation of a user, a degree of urgency of recovering the link of the user, to distribute resources in a more balanced fashion from the perspective of an entire network to perform sequential connection recovery work. In addition, a recommended resource or a recommended beam fed back by a side of the user terminal may assist the first device (for example, the base station) in performing an operation such as beam switching and space diversity more rapidly and more effectively, thereby improving working efficiency of an entire system.

Figure 4A:
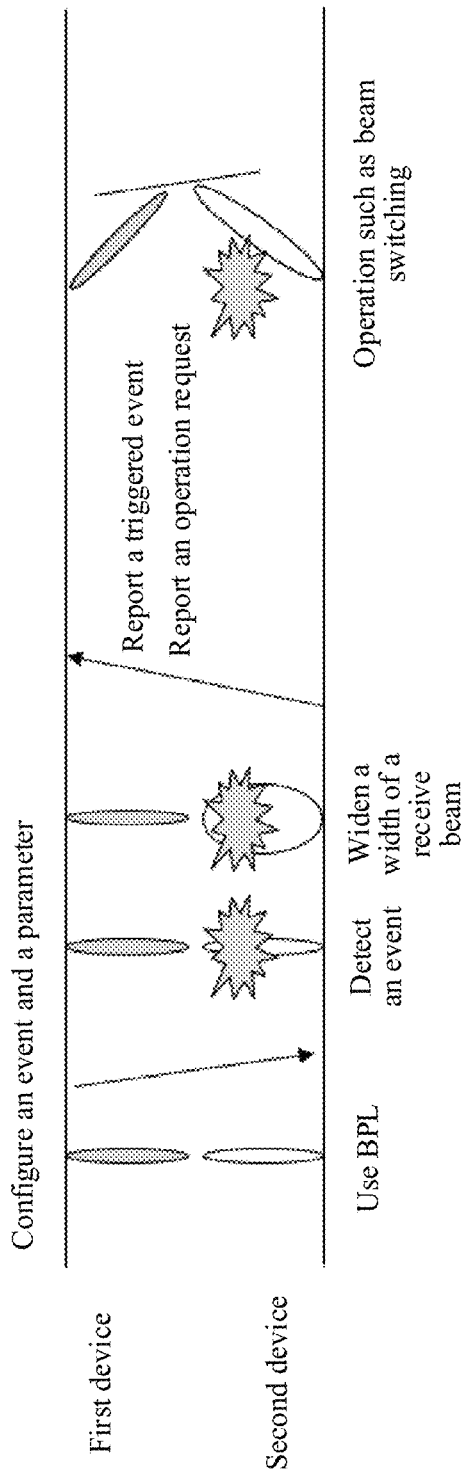
FIG. 4A and FIG. 4B are schematic diagrams of a configuration process of a communication parameter set according to an embodiment of this application.
Figure 4B:
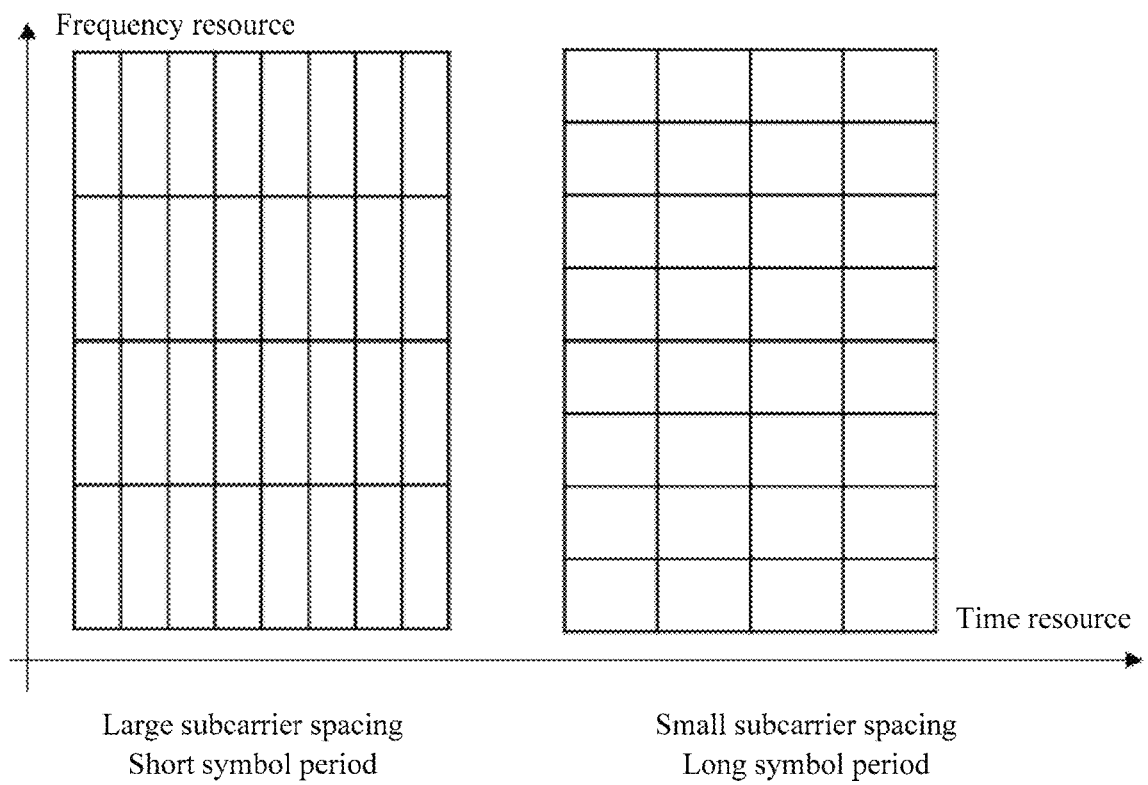

In addition, the first device may further use higher layer signaling to configure, for the first device and the second device, different communication parameter sets used after different quality criterion events are triggered. After a specific quality criterion event is triggered, the first device and the second device communicate by using a corresponding communication parameter set. The communication parameter set is a universal set or a subset of {subcarrier spacing, timeslot length, cyclic prefix type}. for example, in a process of wireless communication between the first device and the second device, the first device configures that when a quality criterion event of a BPL mismatch is not triggered, a small subcarrier spacing, a normal timeslot length, and a normal cyclic prefix are used to perform communication, and after it is determined that a quality criterion event related to a BPL mismatch is triggered, a large subcarrier spacing, a short timeslot length, and an enhanced cyclic prefix are used to perform communication, so that link recovery work can be accelerated, and a link is recovered after a shorter wait time. FIG. 4A and FIG. 4B are schematic diagrams of a process of configuring a specific communication parameter set. FIG. 4B describes different communication parameter sets configured for the second device before and after a quality criterion event is triggered.

In conclusion, the uplink transmission method provided in this embodiment of this application may enable a user terminal to trigger reporting of different information based on a quality condition of a current serving BPL of the user terminal. A plurality of quality criterion events are defined in a higher layer protocol to instruct the user terminal to evaluate a current measurement result. When a measurement result of the user terminal satisfies some conditions, some quality criterion events or a combination of quality criterion events is triggered. Subsequently, the user terminal performs corresponding uplink reporting based on a configuration of a base station after some quality criterion events are triggered. Content of the uplink report may also be configured by the base station in advance. A quality criterion event regulated in a higher layer may include some dynamically configurable parameters such as thresholds and quantities. In addition, in a feedback format of the user terminal, parameters such as a quality criterion event type carried in a feedback and a beam that can still support a connection may be indicated in bottom layer signaling.

For example, a user may keep monitoring an RSRP of a current serving BPL based on a configuration of the base station. When the user terminal finds that the RSRP is lower than a threshold configured by the base station in advance, the user terminal needs to measure the RSRP again after a particular wait. If the RSRP is still lower than the threshold, a beam mismatch event of the user terminal is triggered. The mismatch event may be caused by an obstruction that exists in a path of the BPL. After this type of event is triggered, the user terminal needs to report, based on the configuration of the base station, the event and other related parameters (for example, a parameter for advising the base station to perform a transmit diversity operation), so as to complete a beam recovery process of the user terminal.

Figure 5:
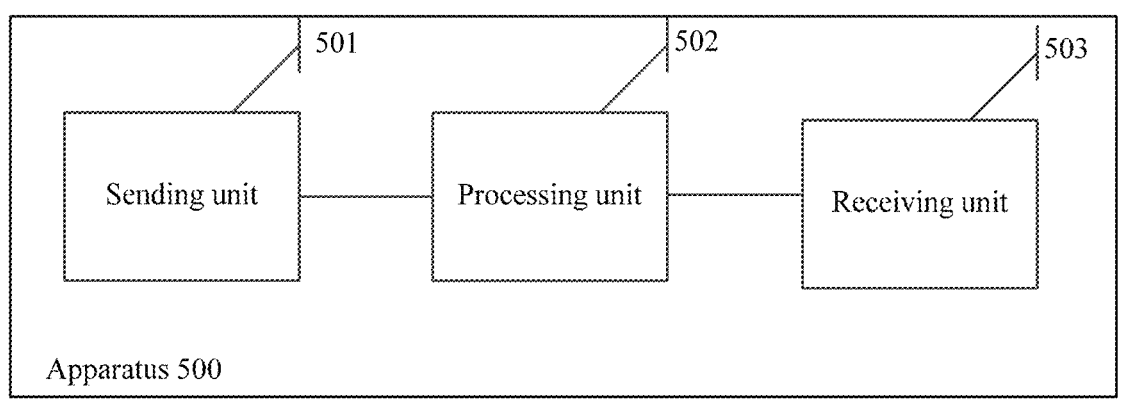
FIG. 5 is a schematic structural diagram of an uplink transmission apparatus according to an embodiment of this application.

Based on the uplink transmission method provided in the foregoing embodiment, referring to FIG. 5, an embodiment of this application provides an uplink transmission apparatus 500. The apparatus 500 is applied to a first device. The first device may be a base station or another network device. FIG. 5 is a schematic structural diagram of the apparatus 500 according to an embodiment of this application. As shown in FIG. 5, the apparatus 500 includes a sending unit 501, a processing unit 502, and a receiving unit 503.

The processing unit 502 is configured to configure a quality criterion event of at least one link between the first device and a second device.

The sending unit 501 is configured to send the quality criterion event of the at least one link between the first device and the second device to the second device, where a quality criterion event of each link includes at least one parameter.

The receiving unit 503 is configured to receive report information determined by the second device based on a quality criterion of the at least one link and the parameter in the quality criterion event of each link.

Optionally, the sending unit 501 is further configured to:
send a reporting rule and a feedback format of the report information to the second device; and
the receiving unit 503 is further configured to receive the report information reported by the second device according to the reporting rule and the feedback format.

Optionally, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

Optionally, the quality criterion event of the link is a specified relationship of the quality of the link between a current moment and a specified moment, and the specified moment is a moment before the current moment or a moment after the current moment.

Optionally, the parameter includes an offset type parameter and a threshold type parameter.

Optionally, the report information includes any combination of: a type of an event triggered by the second device based on the quality criterion event of the link, a recommended operation that the first device is advised to use, and a recommended resource.

Optionally, the processing unit 502 is further configured to:

select a transmit mode and/or a transmit resource and/or a transmit port and/or beamforming and/or a transmit reference signal and/or a measurement process based on the report information.

Optionally, the processing unit 502 is further configured to:

configure a communication parameter set for each quality criterion event, and send the communication parameter set to the second device by using the sending unit 501, where after any quality criterion event is triggered, the first device and the second device communicate by using communication parameters in a corresponding communication parameter set configured for the any quality criterion event, and the communication parameter set is any combination of: a subcarrier spacing, a timeslot length, and a cyclic prefix type.

It should be understood that division of the various units of the apparatus 500 is merely logical function division. During actual implementation, all or some of the units may be integrated into one physical entity or may be physically separated. For example, the foregoing units may be separately disposed processing elements, or may be integrated in a chip of a base station for implementation. In addition, the foregoing units may be alternatively stored in a storage element of the base station in the form of program code, and are invoked by a processing element of the base station to perform the functions of the foregoing units. In addition, the units may be integrated or may be implemented independently. The processing element may be an integrated circuit chip and has a signal processing capability. In an implementation process, steps in the foregoing methods or the foregoing units can be implemented by using a hardware integrated logical circuit in the processing element, or by using instructions in a form of software. The processing element may be a general-purpose processor, for example, a central processing unit (CPU), or may be configured as one or more integrated circuits for implementing the foregoing method, for example, one or more application-specific integrated circuits (ASIC), or, one or more microprocessors (for example, digital signal processor, DSP), or, one or more field programmable gate arrays (FPGA).

It should be noted that for the function implementation and interaction manner of the units of the apparatus 500 in this embodiment of this application, refer to the description of related method embodiments. Details are not described herein again.

Figure 6:
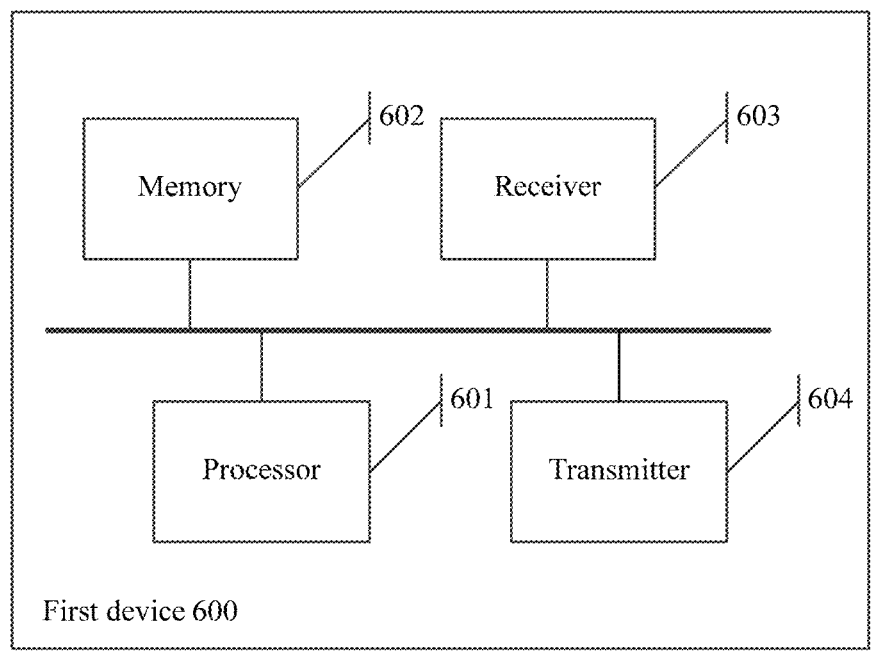
FIG. 6 is a schematic structural diagram of a first device according to an embodiment of this application.

An embodiment of this application further provides a first device 600. The first device 600 may be a base station, or another network device. FIG. 6 is a schematic structural diagram of the first device 600 according to an embodiment of this application. As shown in FIG. 6, the first device 600 includes a processor 601, a memory 602, a receiver 603, and a transmitter 604. Program code for executing the solution of the present invention is stored in the memory 602 and is controlled and executed by the processor 601.

Programs stored in the memory 602 are used to instruct the processor 601 to perform the uplink transmission method, including: configuring a quality criterion event of at least one link between the first device and a second device; sending the quality criterion event of the at least one link between the first device and the second device to the second device, where a quality criterion event of each link includes at least one parameter; and receiving report information determined by the second device based on a quality criterion of the at least one link and the parameter in the quality criterion event of each link.

Optionally, the processor 601 is further configured to:

send a reporting rule and a feedback format of the report information to the second device by using the transmitter 604; and receive, by using the receiver 603, the report information reported by the second device according to the reporting rule and the feedback format.

Optionally, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

Optionally, the quality criterion event of the link is a specified relationship of the quality of the link between a current moment and a specified moment, and the specified moment is a moment before the current moment or a moment after the current moment.

Optionally, the parameter includes an offset type parameter and a threshold type parameter.

Optionally, the report information includes any combination of: a type of an event triggered by the second device based on the quality criterion event of the link, a recommended operation that the first device is advised to use, and a recommended resource.

Optionally, the processor 601 is further configured to:

select a transmit mode and/or a transmit resource and/or a transmit port and/or beamforming and/or a transmit reference signal and/or a measurement process based on the report information.

Optionally, the processor 601 is further configured to:

configure a communication parameter set for each quality criterion event, and send the communication parameter set to the second device by using the transmitter 604, where after any quality criterion event, the first device and the second device communicate by using communication parameters in a corresponding communication parameter set configured for the any quality criterion event, and the communication parameter set is any combination of: a subcarrier spacing, a timeslot length, and a cyclic prefix type.

It may be understood that the first device 600 in this embodiment may be configured to implement all the functions of the first device or the base station in the foregoing method embodiments. For a specific implementation process of the first device 600, refer to related description of the methods performed by the first device, the second device or the base station in the foregoing method embodiments. Details are not described herein again.

It may be understood that the processor 601 in the foregoing device 600 in this embodiment of this application may be a general-purpose central processing unit (CPU), a microprocessor, an application-specific integrated circuit (ASIC), or one or more integrated circuits configured to control execution of the program of the solution in the present invention. One or more memories included in a computer system may be a read-only memory (ROM) or another type of static storage device that can store static information and an instruction, a random-access memory (RAM) or another type of dynamic storage device that can store information and an instruction, or may be a magnetic disk storage. These memories are connected to the processor by using a bus.

The receiver 603 and the transmitter 604 may implement functions thereof by using a transceiver. The transceiver may be a physical module that can implement receiving and transmitting functions, to communicate with another device or a communications network.

The memory 602 such as a RAM stores an operating system and a program for executing the solution of the present invention. The operating system is a program used to control running of another program and manage system resources.

The memory 602, the transmitter 604, and the receiver 603 may be connected to the processor 601 by using a bus, or may be respectively connected to the processor 601 by using a dedicated connection cable.

The processor 601 is designed and programmed to build code corresponding to the method shown below into a chip, so that when being run, the chip can execute a process executed by the first device or the base station in the methods shown in FIG. 1 to FIG. 4B.

Figure 7:
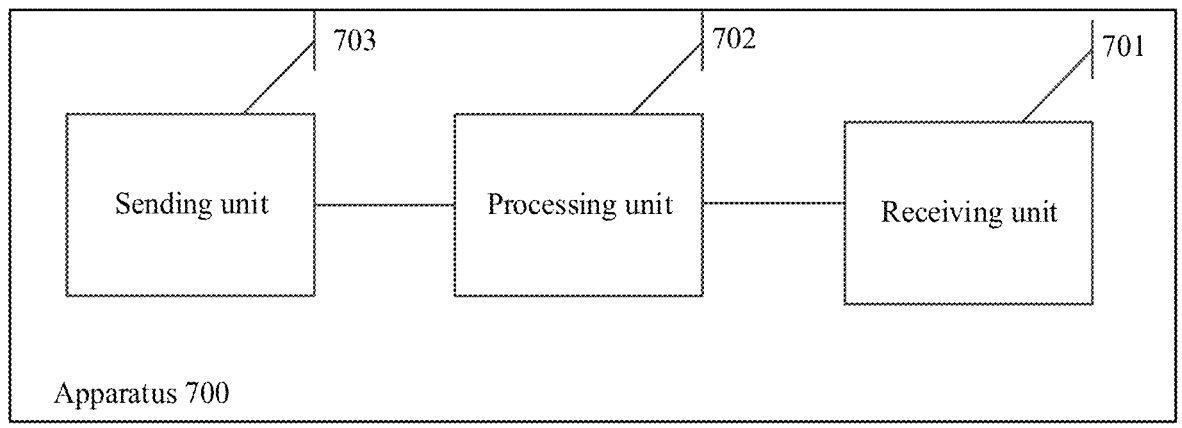
FIG. 7 is a schematic structural diagram of an uplink transmission apparatus according to an embodiment of this application.

Based on the uplink transmission method provided in the foregoing embodiment, referring to FIG. 7, an embodiment of this application provides an uplink transmission apparatus 700. The apparatus 700 is applied to a second device. The second device may be a terminal. FIG. 7 is a schematic structural diagram of the apparatus 700 according to an embodiment of this application. As shown in FIG. 7, the apparatus 700 includes a receiving unit 701, a processing unit 702, and a sending unit 703.

The receiving unit 701 is configured to receive a quality criterion event of at least one link sent by a first device, where a quality criterion event of each link includes at least one parameter.

The processing unit 702 is configured to determine report information based on a quality criterion of the at least one link and the parameter in the quality criterion event of each link.

The sending unit 703 is configured to send the report information to the first device.

Optionally, the receiving unit 701 is further configured to:

receive a reporting rule and a feedback format of the report information that are sent by the first device; and report the report information to the first device according to the reporting rule and the feedback format.

Optionally, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

Optionally, the quality criterion event of the link is a specified relationship of the quality of the link between a current moment and a specified moment, and the specified moment is a moment before the current moment or a moment after the current moment.

Optionally, the parameter includes an offset type parameter and a threshold type parameter.

Optionally, the report information includes any combination of: a type of an event triggered by the second device based on the quality criterion event of the link, a recommended operation that the first device is advised to use, and a recommended resource.

Optionally, the processing unit 702 is further configured to:

receive, by using the receiving unit 701, a communication parameter set configured by the first device for each quality criterion event, where after any quality criterion event is triggered, the second device and the first device communicate by using communication parameters in a corresponding communication parameter set configured for the any quality criterion event, and the communication parameter set is any combination of: a subcarrier spacing, a timeslot length, and a cyclic prefix type.

It should be understood that division of the various units of the apparatus 700 is merely logical function division. During actual implementation, all or some of the units may be integrated into one physical entity or may be physically separated. For example, the foregoing units may be separately disposed processing elements, or may be integrated in a chip of a terminal for implementation. In addition, the foregoing units may be alternatively stored in a storage element of the terminal in the form of program code, and are invoked by a processing element of the terminal to perform the functions of the foregoing units. In addition, the units may be integrated or may be implemented independently. The processing element may be an integrated circuit chip and has a signal processing capability. In an implementation process, steps in the foregoing methods or the foregoing units can be implemented by using a hardware integrated logical circuit in the processing element, or by using instructions in a form of software. The processing element may be a general-purpose processor, for example, a central processing unit (CPU), or may be configured as one or more integrated circuits for implementing the foregoing methods, for example, one or more application specific integrated circuits (ASIC), or, one or more microprocessors (for example, digital signal processor, DSP), or, one or more field programmable gate arrays (FPGA).

It should be noted that for the function implementation and interaction manner of the units of the apparatus 700 in this embodiment of this application, refer to the description of related method embodiments. Details are not described herein again.

Figure 8:
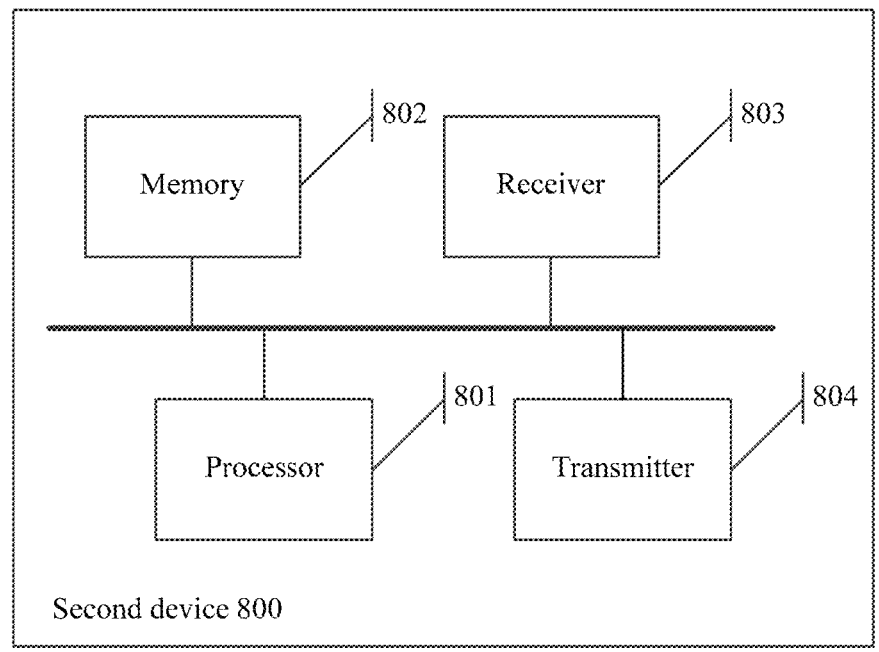
FIG. 8 is a schematic structural diagram of a second device according to an embodiment of this application.

An embodiment of this application further provides a second device 800. The second device 800 may be a terminal or another device located on a terminal. FIG. 8 is a schematic structural diagram of the second device 800 according to an embodiment of this application. As shown in FIG. 8, the second device 800 includes a processor 801, a memory 802, a receiver 803, and a transmitter 804. Program code for executing the solution of the present invention is stored in the memory 802, and is controlled and executed by the processor 801.

Program stored in the memory 802 is used to instruct the processor 801 to execute the uplink transmission method, including: receiving a quality criterion event of at least one link sent by a first device, where a quality criterion event of each link includes at least one parameter; determining report information based on a quality criterion of the at least one link and the parameter in the quality criterion event of each link; and sending the report information to the first device.

Optionally, the processor 801 is further configured to:

receive, by using the receiver 803, a reporting rule and a feedback format of the report information that are sent by the first device; and report, by using the transmitter 804, the report information to the first device according to the reporting rule and the feedback format.

Optionally, the quality criterion event of the link is a specified relationship between quality of a current link and a first reference object or is a specified relationship between quality of another link monitored by the second device and a second reference object, the first reference object is a specified threshold or is the quality of the another link monitored by the second device, and the second reference object is a specified threshold or is the quality of the current link.

Optionally, the quality criterion event of the link is a specified relationship of the quality of the link between a current moment and a specified moment, and the specified moment is a moment before the current moment or a moment after the current moment.

Optionally, the parameter includes an offset type parameter and a threshold type parameter.

Optionally, the report information includes any combination of: a type of an event triggered by the second device based on the quality criterion event of the link, a recommended operation that the first device is advised to use, and a recommended resource.

Optionally, the processor 801 is further configured to:

receive, by using the receiver 803, a communication parameter set configured by the first device for each quality criterion event, where after any quality criterion event is triggered, the first device and the first device communicate by using communication parameters in a corresponding communication parameter set configured for the any quality criterion event, and the communication parameter set is any combination of: a subcarrier spacing, a timeslot length, and a cyclic prefix type.

It may be understood that the second device 800 in this embodiment may be configured to implement all functions of the second device or the terminal in the foregoing method embodiments. For a specific implementation process of the second device 800, refer to descriptions of the methods performed by the second device or the terminal in the foregoing method embodiments. Details are not described herein again.

It may be understood that the processor 801 in the foregoing device 800 in this embodiment of this application may be a general-purpose central processing unit (CPU), a microprocessor, an application-specific integrated circuit (ASIC), or one or more integrated circuits configured to control execution of the program of the solution in the present invention. One or more memories included in a computer system may be a read-only memory read-only memory (ROM) or another type of static storage device that can store static information and an instruction, a random-access memory random-access memory (RAM) or another type of dynamic storage device that can store information and an instruction, or may be a magnetic disk storage. These memories are connected to the processor by using a bus.

The receiver 803 and the transmitter 804 may implement functions thereof by using a transceiver. The transceiver may be a physical module that can implement receiving and transmitting functions, to communicate with another device or a communications network.

The memory 802 such as a RAM stores an operating system and a program for executing the solution of the present invention. The operating system is a program used to control running of another program and manage system resources.

The memory 802, the transmitter 804, and the receiver 803 may be connected to the processor 801 by using a bus or may be respectively connected to the processor 801 by using a dedicated connection cable.

The processor 801 is designed and programmed to build code corresponding to the method shown below into a chip, so that when being run, the chip can perform a process performed by the second device in the methods shown in FIG. 1 to FIG. 4B.

Figure 9:
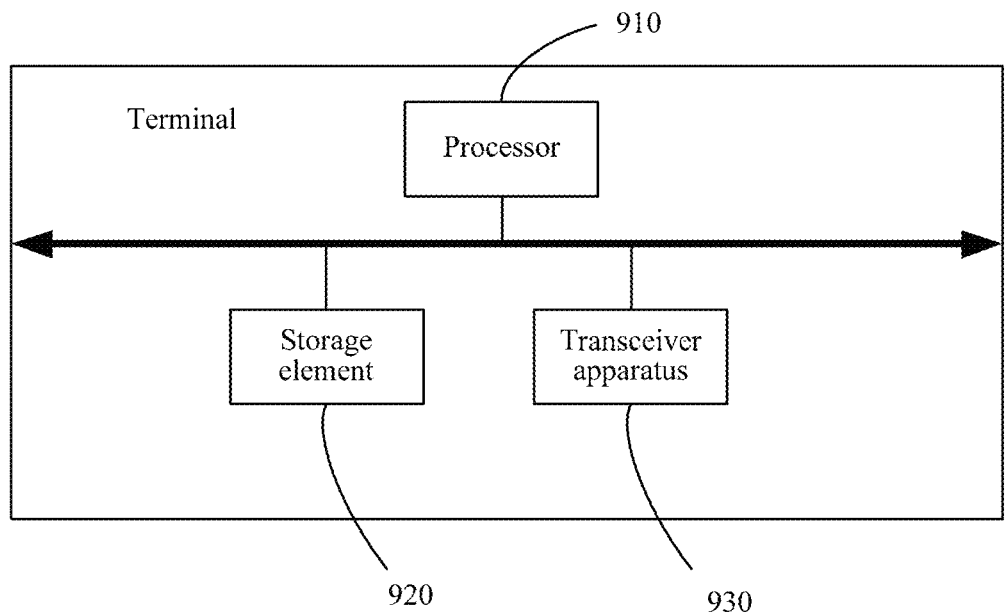
FIG. 9 is a schematic structural diagram of a terminal according to an embodiment of this application.

FIG. 9 is a schematic structural diagram of a terminal according to an embodiment of this application. As shown in FIG. 9, the terminal includes: a processor 910, a storage element 920, and a transceiver apparatus 930. The transceiver 930 may be connected to an antenna. In a downlink direction, the transceiver apparatus 930 receives, by using the antenna, information sent by a base station and sends the information to the processor 910 for processing. In an uplink direction, the processor 910 processes data of a terminal and sends the data to the base station by using the transceiver apparatus 930.

The storage element 920 is configured to store program code for implementing the foregoing method embodiments or the units in the embodiment shown in FIG. 7. The processor 910 invokes the program code to perform the operations in the foregoing method embodiments to implement the units shown in FIG. 7.

For example, the storage element 920 is configured to store the program code for instructing the processor 910 to perform the uplink transmission method.

The processor 910 is configured to invoke the program code stored in the storage element 920 to perform the following steps: receiving a quality criterion event of at least one link sent by a first device, where a quality criterion event of each link includes at least one parameter; determining report information based on a quality criterion of the at least one link and the parameter in the quality criterion event of each link; and sending the report information to the first device.

Some or all of the foregoing units may be built in a chip of a terminal in the form of a field programmable gate array (FPGA), and may be implemented independently or may be integrated together.

As described above, the processing element herein may be a general-purpose processor, for example, a central processing unit (CPU), or may be configured as one or more integrated circuits, for example, one or more application-specific integrated circuits (ASIC), or, one or more microprocessors (for example, digital signal processor, DSP), or, one or more field programmable gate arrays (FPGA), for implementing the foregoing methods. A storage element may be a storage apparatus, or may be a general name for a plurality of storage elements.

In addition, the processor may be provided with a plurality of interfaces, which are separately configured to connect to a peripheral or an interface circuit connected to a peripheral, for example, an interface configured to connect to a display screen, an interface configured to connect to a camera, or an interface configured to connect to an audio processing element.

Figure 10:
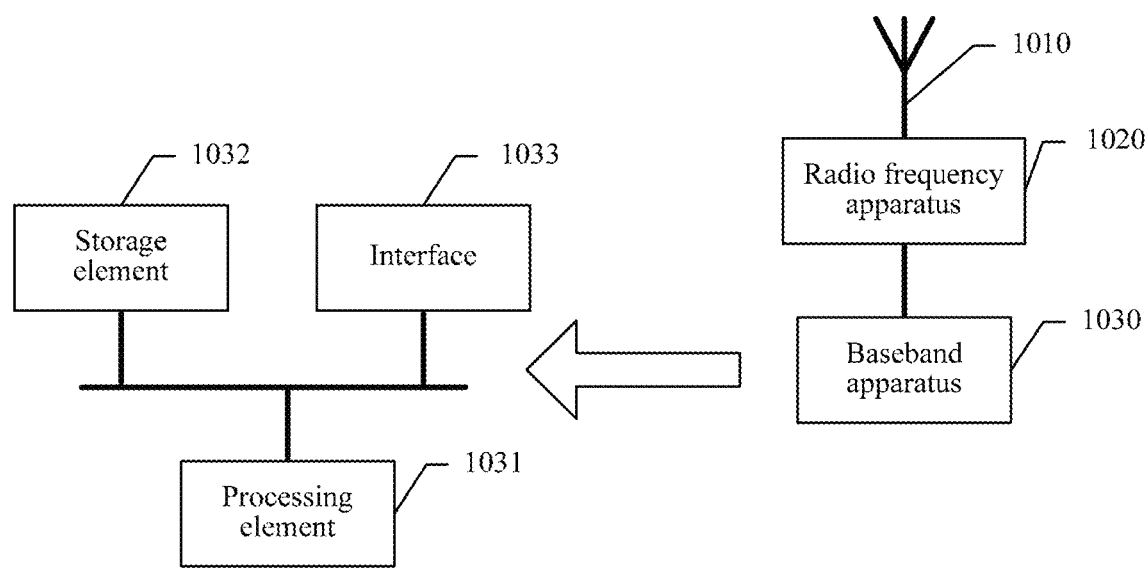
FIG. 10 is a schematic structural diagram of a base station according to an embodiment of this application.

FIG. 10 is a schematic structural diagram of a base station according to an embodiment of this application. As shown in FIG. 10, the base station includes an antenna 1010, a radio frequency apparatus 1020, and a baseband apparatus 1030. The antenna 1010 is connected to the radio frequency apparatus 1020. In an uplink direction, the radio frequency apparatus 1020 receives, by using the antenna 1010, information sent by the terminal, and sends, to the baseband apparatus 1030, the information sent by the terminal for processing. In a downlink direction, the baseband apparatus 1030 processes information about the terminal, and sends the information to the radio frequency apparatus 1020. After processing the information about the terminal, the radio frequency apparatus 1020 sends the information to the terminal by using the antenna 1010.

The foregoing apparatus 500 may be located at the baseband apparatus 1030, and includes a processing element 1031 and a storage element 1032. For example, the baseband apparatus 1030 may include at least one baseband processing board. A plurality of chips are disposed on the baseband processing board. As shown in FIG. 10, one of the chips is, for example, the processing element 1031, and is connected to the storage element 1032 to invoke a program in the storage element 1032 to perform an operation in the foregoing method embodiments. The baseband apparatus 1030 may further include an interface 1033, configured to exchange information with the radio frequency apparatus 1020. The interface is, for example, common public radio interface (CPRI).

For another example, in FIG. 5, the processing unit 502 may be implemented by using a chip of the baseband apparatus 1030, and the sending unit 501 is implemented by using another chip of the baseband apparatus 1030. Alternatively, the processing unit 502 and the sending unit 501 are integrated and are implemented by using one chip of the baseband apparatus 1030. Alternatively, the functions of the processing unit 502 and the sending unit 501 are stored in a storage element of the baseband apparatus 1030 in the form of program code, and are scheduled and implemented by using one processing element of the baseband apparatus 1030. Implementation of other units is similar.

As described above, the processing element herein may be a general-purpose processor, for example, a central processing unit (CPU), or may be configured as one or more integrated circuits, for example, one or more application-specific integrated circuits (ASIC), or, one or more microprocessors (for example, digital signal processor, DSP), or, one or more field programmable gate arrays (FPGA), for implementing the foregoing methods.

The storage element may be a memory, or may be a general name of a plurality of storage elements.

Based on the same technical concept, for the principles for resolving the problem and beneficial effects of the uplink transmission apparatus or device provided in some embodiments of this application, refer to the implementations of and the beneficial effects brought by the method in FIG. 2. For the implementation of the apparatus or device, refer to the implementation of the foregoing method embodiments. Details of repeated parts are not described.

All or some of the foregoing embodiments may be implemented by means of software, hardware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, a twisted pair, an optical fiber) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A communication method, comprising:
sending, by a first device, a quality criterion event of at least one link between the first device and a second device to the second device, wherein a quality criterion event of each link comprises at least one parameter, wherein the at least one parameter comprises at least one offset type parameter, and wherein the at least one offset type parameter comprises at least one of a frequency offset or a beam offset; and
receiving, by the first device, report information determined by the second device based on a quality criterion of the at least one link and the at least one parameter of the quality criterion event of each link.

2. The method according to claim 1, further comprising:
sending, by the first device, a reporting rule and a feedback format of the report information to the second device; and
receiving, by the first device, the report information reported by the second device according to the reporting rule and the feedback format.

3. The method according to claim 1, wherein the quality criterion event of the link is a specified relationship between quality of a current link and a first reference object or is a specified relationship between quality of another link monitored by the second device and a second reference object, wherein the first reference object is a specified threshold or is the quality of the another link monitored by the second device, and wherein the second reference object is a specified threshold or is the quality of the current link.

4. The method according to claim 1, wherein the quality criterion event of the link is a specified relationship of quality of the link between a current moment and a specified moment, and wherein the specified moment is a moment before the current moment or a moment after the current moment.

5. The method according to claim 1, wherein the at least one parameter comprises a threshold type parameter.

6. The method according to claim 1, wherein the report information comprises any combination of a type of an event triggered by the second device based on the quality criterion event of the link, a recommended operation that the first device is advised to use, and a recommended resource.

7. The method according to claim 6, after receiving, by the first device, report information determined by the second device based on a quality criterion of the at least one link and the at least one parameter in the quality criterion event of each link, further comprising:
selecting, by the first device, at least one of a transmit mode, a transmit resource, a transmit port, beamforming, a transmit reference signal, or a measurement process based on the report information.

8. The method according to claim 1, further comprising:
configuring, by the first device, a communication parameter set for each quality criterion event; and
sending the communication parameter set to the second device, wherein after any quality criterion event is triggered, the first device and the second device communicate by using communication parameters in a corresponding communication parameter set configured for the any quality criterion event, and wherein the communication parameter set is any combination of a subcarrier spacing, a timeslot length, and a cyclic prefix type.

9. The method according to claim 1, further comprising:
sending, by the first device, a parameter M to the second device, wherein M is a positive integer; and
receiving, by the first device, the report information from the second device when events of M or more links between the first device and the second device are triggered.

10. An apparatus, applied to a first device, comprising:
at least one processor; and
an interface circuitry, wherein the at least one processor and the interface circuitry are coupled with each other, and wherein the at least one processor executes program instructions to cause the apparatus to perform operations comprising:
configuring a quality criterion event of at least one link between the first device and a second device;
sending the quality criterion event of the at least one link between the first device and the second device to the second device, wherein a quality criterion event of each link comprises at least one parameter, wherein the at least one parameter comprises at least one offset type parameter, and wherein the at least one offset type parameter comprises at least one of a frequency offset or a beam offset; and
receiving report information determined by the second device based on a quality criterion of the at least one link and the at least one parameter in the quality criterion event of each link.

11. The apparatus according to claim 10, wherein the operations further comprise:
sending a reporting rule and a feedback format of the report information to the second device; and
receiving the report information reported by the second device according to the reporting rule and the feedback format.

12. The apparatus according to claim 10, wherein the quality criterion event of the link is a specified relationship between quality of a current link and a first reference object or is a specified relationship between quality of another link monitored by the second device and a second reference object, wherein the first reference object is a specified threshold or is the quality of the another link monitored by the second device, and wherein the second reference object is a specified threshold or is the quality of the current link.

13. The apparatus according to claim 10, wherein the quality criterion event of the link is a specified relationship of quality of the link between a current moment and a specified moment, and wherein the specified moment is a moment before the current moment or a moment after the current moment.

14. The apparatus according to claim 10, wherein the at least one parameter comprises a threshold type parameter.

15. The apparatus according to claim 10, wherein the report information comprises any combination of a type of an event triggered by the second device based on the quality criterion event of the link, a recommended operation that the first device is advised to use, and a recommended resource.

16. The apparatus according to claim 15, wherein the operations further comprise:
selecting at least one of a transmit mode, a transmit resource, a transmit port, beamforming, a transmit reference signal, or a measurement process based on the report information.

17. The apparatus according to claim 10, wherein the operations further comprise:
configuring a communication parameter set for each quality criterion event; and
sending the communication parameter set to the second device, wherein after any quality criterion event is triggered, communicating with the first device by using communication parameters in a corresponding communication parameter set configured for the any quality criterion event, and wherein the communication parameter set is any combination of a subcarrier spacing, a timeslot length, and a cyclic prefix type.

18. The apparatus according to claim 10, wherein the operations further comprise:
sending a parameter M to the second device, wherein M is a positive integer; and
receiving the report information from the second device when events of M or more links between the first device and the second device are triggered.

19. A non-transitory computer-readable storage media comprising instructions which, when executed by one or more processors, cause the one or more processors to perform operations comprising:
sending, by a first device, a quality criterion event of at least one link between the first device and a second device to the second device, wherein a quality criterion event of each link comprises at least one parameter, wherein the at least one parameter comprises at least one offset type parameter, and wherein the at least one offset type parameter comprises at least one of a frequency offset or a beam offset; and receiving, by the first device, report information determined by the second device based on a quality criterion of the at least one link and the at least one parameter of the quality criterion event of each link.

20. The non-transitory computer-readable storage media according to claim 19, the operations further comprising:

sending, by the first device, a reporting rule and a feedback format of the report information to the second device; and receiving, by the first device, the report information reported by the second device according to the reporting rule and the feedback format.

* * * * *